Feb. 4, 1941.                O. T. PIEPER                2,230,515
                       MOTION TRANSMITTING DEVICE
                          Filed June 8, 1939
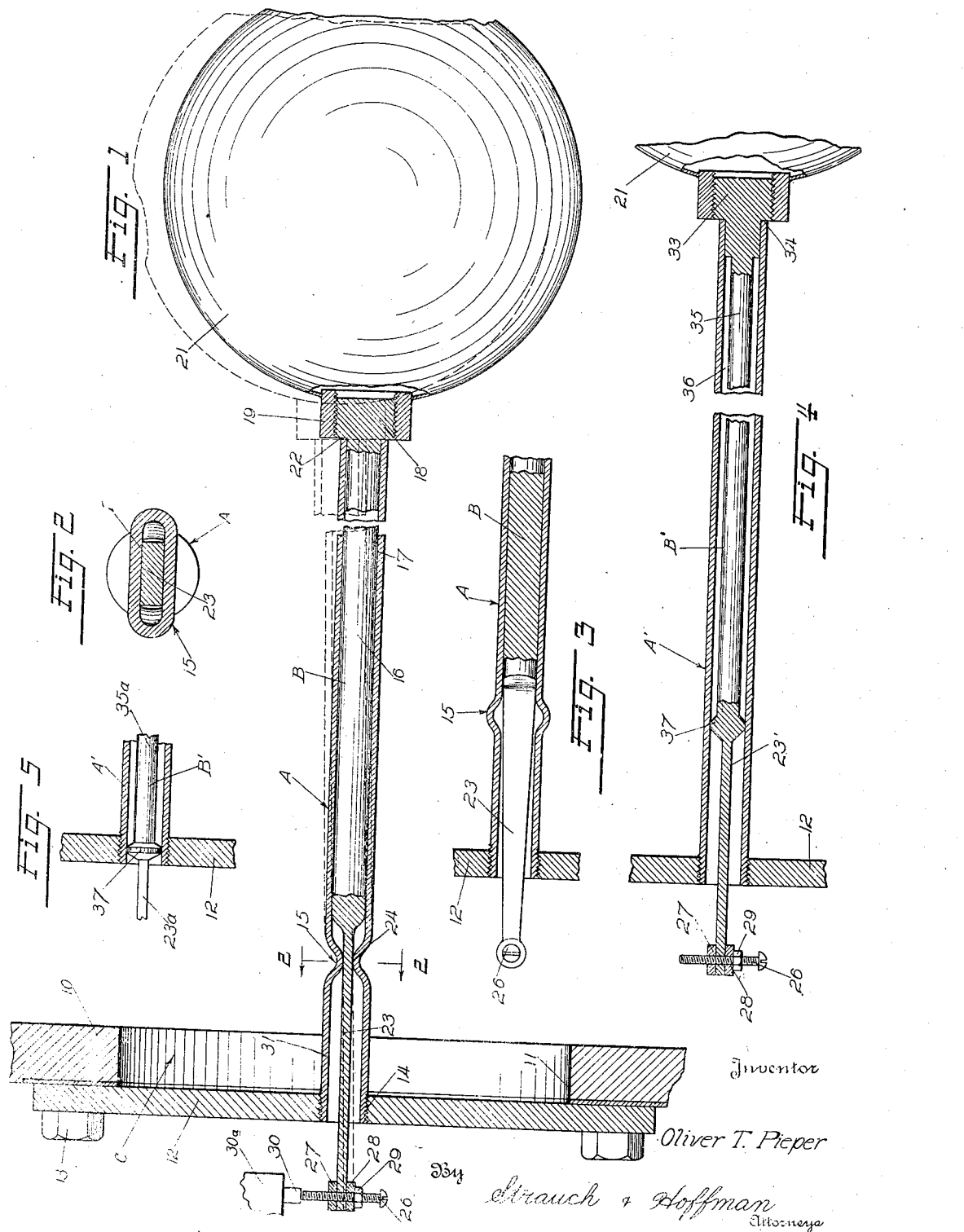
Inventor
Oliver T. Pieper
By Strauch & Hoffman
Attorneys Patented Feb. 4, 1941

2,230,515

UNITED STATES PATENT OFFICE 2,230,515

MOTION TRANSMITTING DEVICE

Oliver T. Pieper, Wilmington, Del.

Application June 8, 1939, Serial No. 278,173

8 Claims. (Cl. 286—29)

This invention relates to devices for transmitting a limited amount of motion from one side of a wall to another, from the interior of a closed chamber to its exterior or from its exterior to its interior, and more particularly to devices for transmitting motion through a wall without using sliding or rotating parts, so as to avoid leakage.

Although devices of this general character have been heretofore proposed, they are not altogether satisfactory and have not gone into use, primarily because they embody a rocking member which lacks a definite fulcrum point, with the result that motion originating on one side of the wall is not accurately transmitted to the other side of the wall.

It is accordingly the primary object of my invention to provide a novel device whereby a limited amount of motion, originating on one side of a wall, may, without the existence of any opening in the wall, be transmitted through said wall without recourse to any means involving any friction, wear or relatively movable parts, thereby precluding leakage.

A further object is to provide as an incident to the accomplishment of the first object, a novel device capable of exerting elastic resistance to the action of part or all of the force producing the motion to be transmitted, so that the elastic deformation of the essential elements of the invention shall perform the dual function of transmitting motion and providing an elastic resistance to the force producing such motion.

A further object of this invention is to produce, for the purpose set forth, simple, cheap, and reliable means adaptable to a wide range of pressure conditions, materials of construction, and practical applications.

My invention also aims to provide a motion transmitting device which is capable of efficiently transmitting motion through a wall without fluid leakage, employs no sliding or pivoted parts, and yet which embodies a part rockable about a definite fulcrum and which will accurately transmit a rocking motion originating on one side of the wall to the other.

Further objects will become apparent as the specification proceeds in connection with the annexed drawing, and from the appended claims.

In the drawing,

Figure 1 is a vertical sectional view through a device embodying my invention and illustrates it as being applied to a float type of control system;

Figure 2 is a vertical sectional view, on an enlarged scale, taken along the line 2—2 of Figure 1, looking in the direction of the arrows, and illustrates the relationship of the parts at the crimped joint;

Figure 3 is a bottom view in section of the device shown in Figures 1 and 2;

Figure 4 is a view similar to Figure 1, but illustrates a modified form of device also forming part of the invention; and Figure 5 is a fragmental sectional view showing a further modification of the invention.

With continued reference to the drawing, wherein like reference characters have been employed to designate like parts throughout the several views, I have chosen to illustrate, by way of a concrete example of the invention, my device as being applied to a float control mechanism disposed in a chamber C having a wall 10. The latter is provided with an opening 11.

It is to be understood however that my novel motion transmitting device may be used in any desirable situation wherever a motion originating on one side of a wall is to be transmitted to the other side of the wall without leakage, friction or wear. For instance instead of having the force originate on one side of the wall in a float mechanism, it may originate in a pressure or vacuum responsive means such as a diaphragm; bellows; piston and cylinder; or other motion producing means.

The novel device of my invention comprises a tube designated generally as A and a lever B contained within the tube. Tube A is preferably circular in section, although it may be polygonal and it is constructed of an elastic or resilient material. Its specific character will be dictated by the character of work which the device is called upon to perform. For instance, if it is used to control the level of certain liquids stainless steel has been found to be wholly satisfactory. On the other hand for certain chemical processes, Bakelite; other resins; and certain alloys may be more suitable. Also, in handling highly corrosive materials such as sulfuric acid, a glass tube may be successfully employed.

Tube A is secured to a mounting plate 12, which in turn is secured to wall 10 over opening 11 by means of a plurality of cap screws 13, a gasket being employed to secure a fluid tight joint. Tube A may be sealingly secured to plate 12 in any suitable manner at the point 14. In the present instance it has been shown as secured with a self-sealing tapered pipe joint threaded connection. If desired, however, it may be flanged and secured to plate 12 in the manner of flanged pipe joints. It may be welded, soldered, brazed or secured in any other suitable manner, depending upon the various factors affecting the particular installation.

I have found that when tube A is of uniform section throughout its length it will undergo a general bending all along its length when its free end is deflected, or moved transversely of its length, but by providing a crimped or flattened portion 15 the tube is rendered extremely flexible at the point of the crimp, and yet retains its elasticity and will return to its normal position when the deflecting force has been removed.

Disposed within tube A is a lever B and which, like tube A may be constructed of any material found suitable for the purpose in the particular application to which it is applied. However, as it is not exposed to the liquid or gas within chamber C, it need not be of special resistant material. It is preferably constructed of steel so as to be comparatively rigid and accurately transmit motion from one side of the wall to the other.

Lever B is provided with an enlarged body portion 16, which closely fits the internal surface of tube A and the parts may be secured together at points along their length as at 17 by means of welding, soldering, brazing or any other suitable operation. The free end of lever B is provided with a head 18, which is threaded into the socket 19 of a float 21. Head 18 is preferably secured to tube A at point 22 by means of welding, soldering, or the like, depending upon the character of the materials.

Just outwardly of crimped portion 16 of the tube, lever B is preferably reduced in section so as to provide a flat arm portion 23 which is preferably tightly clamped or crimped between the walls of tube A at 24.

The free end of arm 23 may be employed to actuate any suitable form of mechanism. For instance, it may open or close an electric circuit, open or close a valve or any other mechanical device. If desired it may be used to operate an indicator to indicate the movements of float 21 or the other device within the chamber. In the present instance however, I have illustrated it as being provided with a screw 26 which is locked in adjusted position by means of a plurality of nuts 27, 28 and 29. As above pointed out, screw 26 may cooperate with any desired control mechanism. I have shown it as cooperating with a valve operating rod 30 carried by a valve body 30a.

It is therefore apparent that I have provided a device for efficiently transmitting motion from one side of the wall to the other without fluid leakage and which does not embody any seals or frictional members for preventing fluid transfer between opposite sides of the wall.

Taking up the operation of the device as a whole, and assuming chamber C is being filled with liquid at a predetermined rate, and it is desired to automatically shut off the flow when the liquid attains a predetermined height, as the liquid flows into the chamber the buoyancy of the float causes it to raise and lift or deflect the outer end of tube A. This action is resisted by the inherent resilience or elasticity of the tube and lever, and the portion of the tube outwardly of the crimp portion 15 is prevented from flexing or bowing by reason of rod B closely engaging its inner wall, with the result that it behaves as a rigid lever.

I have also found that when this deflecting action is taking place, crimp portion 15 produces what may be termed a localized zone of low resistance to flexure, and that the portion 31 of the tube adjacent plate 12, even though it is not reenforced inside, does not undergo any substantial bending or deflection. The outer end of the tube therefore, in effect, rocks in a counterclockwise direction around crimp portion 15 and as an axis when the float raises as just described. As the lifting action proceeds in the manner just described, arm portion 23 of the lever rocks upon crimp portion 15 of the tube as a flucrum, and when the predetermined level is attained the parts of tube A assume the general positions indicated by the dotted lines in Figure 1.

Counterclockwise rocking of tube A about crimp point 15 as an axis causes an exactly similar rocking movement, but to a lesser degree of arm 23, causing screw 26 to be lowered, together with plunger 30. This movement may be utilized to shut off the valve supplying liquid to the chamber or in the case of a motor and pump, it may be employed to break the motor circuit or a relay connected to the circuit.

Since arm 23 is shorter than portion 16 of the lever, the mechanical advantage is such that a predetermined movement of the float will be reflected as a smaller movement of screw 26. It is to be understood however that the length of arm 23; the position of the crimp 15 with respect to the longitudinal axis of tube A; the diameter of the tube; the material of the tube; and the length of portion 16 of the lever and the mechanical advantage may all be varied to adapt the device to the particular installations at hand. The invention is by no means limited to the proportions shown in this particular example of my device.

In Figure 4 I have illustrated a device somewhat similar to the one just described. The major difference resides in the omission of the crimped portion of the tube. In this instance tube A' is of uniform section throughout and contains a lever B' of modified form. Lever B' is provided with enlarged head 33 which is secured in the bore of the float as before, and the tube and lever are rigidly connected at 34. However, in this instance the body portion 35 of the lever is of reduced diameter, so as to provide an annular space 36 from a point adjacent the float to a point adjacent mounting plate 12.

Adjacent the mounting plate, lever B' is provided with an enlarged portion 37, which closely engages the inner wall of the tube. The free end of the lever 23' is flattened as in the first form of the invention and is provided with an exactly similar screw and lock nut assembly.

In the operation of this form of the invention, raising movement of the float causes the entire length of the tube A' to smoothly bow or flex between enlarged portion 37 of the lever and its point of juncture with the float at the other end. As this occurs, the free end of the lever fulcrums on enlarged portion 37 and is depressed. I have found that this form of the invention represents great advance over structures heretofore proposed, but as it requires a lever arm of somewhat greater length than the form of the invention shown in Figure 1 because, as just pointed out, instead of flexing at a predetermined localized point, the tube smoothly bows or flexes over a considerable portion of its length.

In Figure 5 I have illustrated a further modification of the device shown in Figure 4. In this form of the invention the lever B' is provided with a longer body portion 35a so as to locate fulcrum portion 37 closely adjacent the end of tube A' and within mounting plates 12. In this form of the invention up and down movement of the float or other mechanism will be reflected as a smaller movement of the actuating pin 26, due to the decrease in the ratio between lever arm 35a and lever arm 23a.

Although I have shown a lever B which projects entirely through the wall, and prefer this construction because it renders the device simple and compact, it may terminate short of the mouth of the tube and cooperate with a pin or finger projecting partially into the tube without departing from the spirit of the invention. Also, I have shown a flat wall 12, it may be cup-shaped with the cup facing in or out and the tube secured at the bottom of the cup, with the result that no part of the apparatus projects beyond the plane of side wall 10, and it is to be understood that the term "side" as applied to the wall in the appended claims is intended to apply to the sides of the wall in the sense of fluid communication only and it is not limited to the configuration of the wall itself, which may be flat, curved or of any other desired shape. As a matter of fact the entire device, including the float may be mounted outside the plane of the chamber wall and located in a sub-chamber.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a device for transmitting motion from one side of a wall to the other without fluid leakage, a hollow, elongated, resilient member projecting away from one side of said wall; an elongated element disposed in said member and projecting through an opening provided in said wall to the other side of the latter; means, located within said hollow member intermediate the ends thereof, for causing said element to fulcrum about a definite point in said member in response to deflections of the later transverse to its longitudinal axis, and means rigidly connecting a portion of said resilient member to said lever for precluding relative rotation therebetween.

2. In a device for transmitting motion from one side of a wall to the other without fluid leakage, said wall having an opening therein; a tube-like member secured to said wall and closing the opening therein, said member terminating in a free end spaced from said wall, and adapted to have forces applied thereto; said member being sufficiently resilient to permit its free end to undergo deflection transverse to its longitudinal axis in response to application of said forces; an elongated element disposed in said tube-like member and projecting through said opening to the other side of said wall; and fulcrum means, located within said hollow member intermediate the ends thereof, for causing said element to fulcrum about a predetermined point in the length of said member when the latter undergoes deflection, comprising localized areas of line contact provided between said element and said member internally of the latter, for causing said member to fulcrum in a predetermined plane on said areas of contact.

3. In a device for transmitting motion from one side of a wall to the other without fluid leakage, said wall having an opening therein; a tube-like member secured to said wall and closing the opening therein, said member terminating in a free end spaced from said wall, and adapted to have forces applied thereo; said member being sufficiently resilient to permit its free end to undergo deflection transverse to its longitudinal axis in response to application of said forces; an elongated element disposed in said tube-like member and projecting through said opening to the other side of said wall; and fulcrum means located within said hollow member intermediate the ends thereof, for causing said element to fulcrum about a predetermined point in the length of said member when the latter undergoes deflection, comprising an enlarged portion on said element cooperating in rocking engagement with the inner surface of said tube-like member.

4. In a device for transmitting motion from one side of a wall to the other without fluid leakage therebetween, said wall having an opening therein; a tube made of flexible material and closed at one end, said tube having its open end covering the opening in said wall and having its closed end projecting away from said wall; a lever disposed in said tube and projecting toward the other side of said wall, the closed end of said tube being adapted to be deflected transversely to the axis of said tube, so as to flex said tube and produce corresponding deflections of said lever; said tube being provided with a zone of diminished resistance to flexibility in at least one direction, for compelling flexure of said tube to occur at a predetermined point in its length when the outer end thereof is deflected.

5. In a motion transmitting device, a tube adapted to be secured in fluid tight relationship to an opening in a wall; a lever element disposed in said tube and adapted to project through the opening in said wall; said tube being resilient and capable of deflection transversely of its axis, and means for compelling the free end of said tube to move in a predetermined plane when it is deflected, said tube being generally circular in cross-section and said means comprising a flattened portion located intermediate the ends of said tube.

6. In a motion transmitting device, a tube adapted to be secured in fluid tight relationship to an opening in a wall; a lever element disposed in said tube and adapted to project through the opening in said wall; said tube being resilient and capable of deflection transversely of its axis, and means for compelling the free end of said tube to move in a predetermined plane when it is deflected, said tube being generally circular in cross-section and said means comprising a flattened portion tightly engaging said lever element, for causing the latter to fulcrum thereupon.

7. In a motion transmitting device, a tube adapted to be mounted in fluid-tight relationship to an opening in a wall, said tube terminating in a free end spaced from said wall, said tube being generally circular in cross-section and being elastic and capable of deflection transversely of its axis, said tube having a flattened portion adjacent said wall for causing it to flex at said portion when it is deflected; and a lever disposed in said tube and having a reduced portion tightly clamped by said flattened portion and projecting through the opening in said wall, said lever being of a size to tightly engage the inner walls of said tube between said flattened portion and the free end thereof.

8. For use with a wall separating an actuating mechanism from a mechanism adapted to be actuated by said first mechanism, a device for transmitting motion between said mechanisms comprising an elastic tube; and a lever disposed in said tube, said tube being flattened into intimate clamping engagement with said lever at one point in its length, to form a fulcrum for said lever and also cause said tube to have less resistance to bending at said point.

OLIVER T. PIEPER.